United States Patent
Carranza et al.

(10) Patent No.: US 11,868,203 B1
(45) Date of Patent: *Jan. 9, 2024

(54) SYSTEMS AND METHODS FOR COMPUTER INFRASTRUCTURE MONITORING AND MAINTENANCE

(71) Applicant: UNITED SERVICES AUTOMOBILE ASSOCIATION (USAA), San Antonio, TX (US)

(72) Inventors: Manuel A. Carranza, San Antonio, TX (US); Chase T. Sekula, San Antonio, TX (US); Mark S. Moore, Little Elm, TX (US); Mathew P. Ringer, Lytle, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,238

(22) Filed: Nov. 18, 2021

Related U.S. Application Data

(63) Continuation of application No. 16/400,709, filed on May 1, 2019, now Pat. No. 11,216,327, which is a continuation of application No. 15/153,983, filed on May 13, 2016, now Pat. No. 10,318,367.

(60) Provisional application No. 62/162,016, filed on May 15, 2015.

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0769* (2013.01); *G06F 11/0772* (2013.01); *G06F 11/0787* (2013.01)

(58) Field of Classification Search
CPC .............. G06F 11/079; G06F 11/0769; G06F 11/0772; G06F 11/0781; G06F 11/0787; G06F 11/3082; G06F 11/3072
See application file for complete search history.

(56) References Cited

U.S. PATENT DOCUMENTS

| | | | |
|---|---|---|---|
| 5,179,695 A | 1/1993 | Derr et al. | |
| 6,405,327 B1 | 6/2002 | Sipple et al. | |
| 7,971,103 B2 | 6/2011 | Brugler et al. | |
| 8,635,498 B2 * | 1/2014 | Kahana | G06F 11/3476 714/38.1 |
| 9,378,082 B1 | 6/2016 | Nair | |
| 9,418,088 B1 | 8/2016 | Noll | |
| 9,495,234 B1 | 11/2016 | Hamman et al. | |
| 10,318,367 B1 * | 6/2019 | Carranza | G06F 11/0709 |

(Continued)

*Primary Examiner* — Philip Guyton
(74) *Attorney, Agent, or Firm* — BakerHostetler

(57) ABSTRACT

A method for detecting computer issues includes identifying a target computer system. A first set of data for a first time period relating an operating metric from the target computer system are received. The operating metric is stored. A second set of data for a second time period relating to the operating metric is received. The first and second sets of data are compared. A difference between the two sets of data is identified. If the difference between the two sets of data is within a range a warning notification is displayed in a graphical user interface. An input is received in the graphical user interface in response to the warning notification being displayed.

19 Claims, 4 Drawing Sheets

(56) References Cited

U.S. PATENT DOCUMENTS

| | | | |
|---|---|---|---|
| 11,216,327 B1* | 1/2022 | Carranza | H04L 43/067 |
| 2005/0091003 A1 | 4/2005 | Wu | |
| 2008/0301076 A1* | 12/2008 | Timmins | G06Q 10/06 706/46 |
| 2012/0054331 A1 | 3/2012 | Dagan | |
| 2013/0185021 A1 | 7/2013 | Addison et al. | |
| 2014/0053025 A1 | 2/2014 | Marvasti et al. | |
| 2014/0195868 A1 | 7/2014 | Hasegawa | |
| 2015/0248339 A1 | 9/2015 | Mathur et al. | |
| 2015/0379864 A1* | 12/2015 | Janchookiat | G06F 11/327 340/506 |

* cited by examiner

SYSTEMS AND METHODS FOR COMPUTER INFRASTRUCTURE MONITORING AND MAINTENANCE

CROSS-REFERENCE TO RELATED APPLICATIONS

This application is a continuation of U.S. patent application Ser. No. 16/400,709, filed May 1, 2019 which is a continuation of U.S. patent application Ser. No. 15/153,983, filed May 13, 2016, which issued on Jun. 11, 2019, as U.S. Pat. No. 10,318,367, which claims priority to U.S. Provisional Patent Application No. 62/162,016, filed May 15, 2015, the contents of which is incorporated herein by reference in its entirety.

BACKGROUND OF THE INVENTION

While it is common practice for businesses to monitor their computer networks and software processes, the amount of information that can be obtained may make it prohibitively expensive to diligently monitor that information. Thus, monitoring computer infrastructure may be a constant balancing act between gathering and analyzing enough information so as to reduce the chances of a problem escaping detection, while at the same time triaging the information gathered and analyzed so as to enable the monitoring process a realistic chance to perform the necessary and requested analysis.

When a computer network or software process experiences a complete or partial failure, the resulting damage can be catastrophic. Many of today's monitoring systems can only determine once a system is down, although there may have been certain events leading up to the system failure that could have indicated that the system was going to fail.

Despite many attempts to address these problems, there remains a need for a solution to this problem that is both robust enough to dependably monitor important networks and help determine if a system failure may soon occur, and yet flexible enough to work with any computer or network infrastructure.

Accordingly, there remains an unmet need for a sufficiently flexible and dependable approach to monitoring computer networks and software process output.

SUMMARY OF THE INVENTION

One or more examples described herein relate to monitoring computer infrastructures (e.g., a network, an individual computer system, software processes, or combinations thereof) to detect existing or developing computer issues. In one example, the analytics module compares performance from a given time frame (e.g., the present time or the very recent past) to another time frame (e.g., a week ago). This comparison may reveal one or more differences in terms of error messages, network traffic, computer resource utilization, software process performance, or another computer metric, and, based on the type or level of the difference, a notification (e.g., warning) may be generated and communicated to a network administrator.

In an aspect, this disclosure is directed to a method. The method may include identifying a target computer system. A first set of data for a first time period relating an operating metric from the target computer system may be received. The operating metric may be stored. A second set of data for a second time period relating to the operating metric may be received. The first and second sets of data may be compared. A difference between the two sets of data may be identified. If the difference between the two sets of data is outside a predetermined range a determination may be made that there is an issue on the target computing system that needs to be resolved. A warning notification may be displayed in a graphical user interface, wherein the warning notification is displayed differently depending on a severity level of the warning. Instructions may be provided on how to resolve the issue.

In another aspect, this disclosure is directed to a system. The system may include a computer device connected to a network and a memory electronically coupled to the computer device. The memory may include instructions that cause the at least one computer device to effectuate certain operations. The operations may include identifying a target computer system, receiving a first set of data relating an operating metric from the target computer system, storing the operating metric, receiving a second set of data relating to the operating metric, comparing the first and second sets of data, identifying a difference between the two sets of data, determining that there is an issue that needs to be resolved on the target computing system if the difference between the two sets of data is outside a predetermined range, displaying a warning notification in a graphical user interface, wherein the warning notification may be displayed differently depending on a severity level of the warning, and providing instructions on how to resolve the issue.

According to another aspect, this disclosure is directed to a non-transitory computer readable storage medium. The non-transitory computer readable storage medium may include computer-executable instructions that cause a processor to effectuate certain operations. The operations may include identifying a target computer system, receiving a first set of data relating an operating metric from the target computer system, storing the operating metric, receiving a second set of data relating to the operating metric, comparing the first and second sets of data, identifying a difference between the two sets of data, determining that there is an issue that needs to be resolved on the target computing system if the difference between the two sets of data is outside a predetermined range, displaying a warning notification in a graphical user interface, wherein the warning notification may be displayed differently depending on a severity level of the warning, and providing instructions on how to resolve the issue.

BRIEF DESCRIPTION OF THE DRAWINGS

So that those having ordinary skill in the art, to which the present invention pertains, will more readily understand how to employ the novel system and methods of the present invention, certain illustrated examples thereof will be described in detail herein-below with reference to the drawings, wherein.

A component or a feature that is common to more than one drawing is indicated with the same reference number in each of the drawings.

DETAILED DESCRIPTION

The present disclosure relates to monitoring network and process performance and communications. It is to be appreciated the subject invention is described below more fully with reference to the accompanying drawings, in which illustrated examples are shown. The present invention is not limited in any way to the illustrated examples as the illustrated examples described herein are merely exemplary of the invention, which may be embodied in various forms, as appreciated by one skilled in the art. Therefore, it is to be understood that any structural and functional details disclosed herein are not to be interpreted as limiting, but merely as a basis for the claims and as representative for teaching one skilled in the art to variously employ the present invention. Furthermore, the terms and phrases used herein are not intended to be limiting but rather to provide an understandable description of the invention. Further, any component or a feature that is common to more than one drawing is indicated with the same reference number in each of the drawings.

Unless defined otherwise, all technical and scientific terms used herein have the same meaning as commonly understood by one of ordinary skill in the art to which this invention belongs. Although any methods and materials similar or equivalent to those described herein may also be used in the practice or testing of the present invention, exemplary methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated that certain examples of this invention as discussed herein may be a software algorithm, program or code residing on a computer useable medium having control logic for enabling execution on a machine having a computer processor. The machine typically includes memory storage configured to provide output from execution of the computer algorithm or program. As used herein, the term "software" is meant to be synonymous with any code or program that may be in a processor of a host computer, regardless of whether the implementation is in hardware, firmware or as a software computer product available on a disc, a memory storage device, or for download from a remote machine. The examples described herein include such software to implement the equations, relationships and algorithms described above. One skilled in the art will appreciate further features and advantages of the invention based on the above-described examples. Accordingly, the invention is not to be limited by what has been particularly shown and described, except as indicated by the appended claims.

Figure 1:
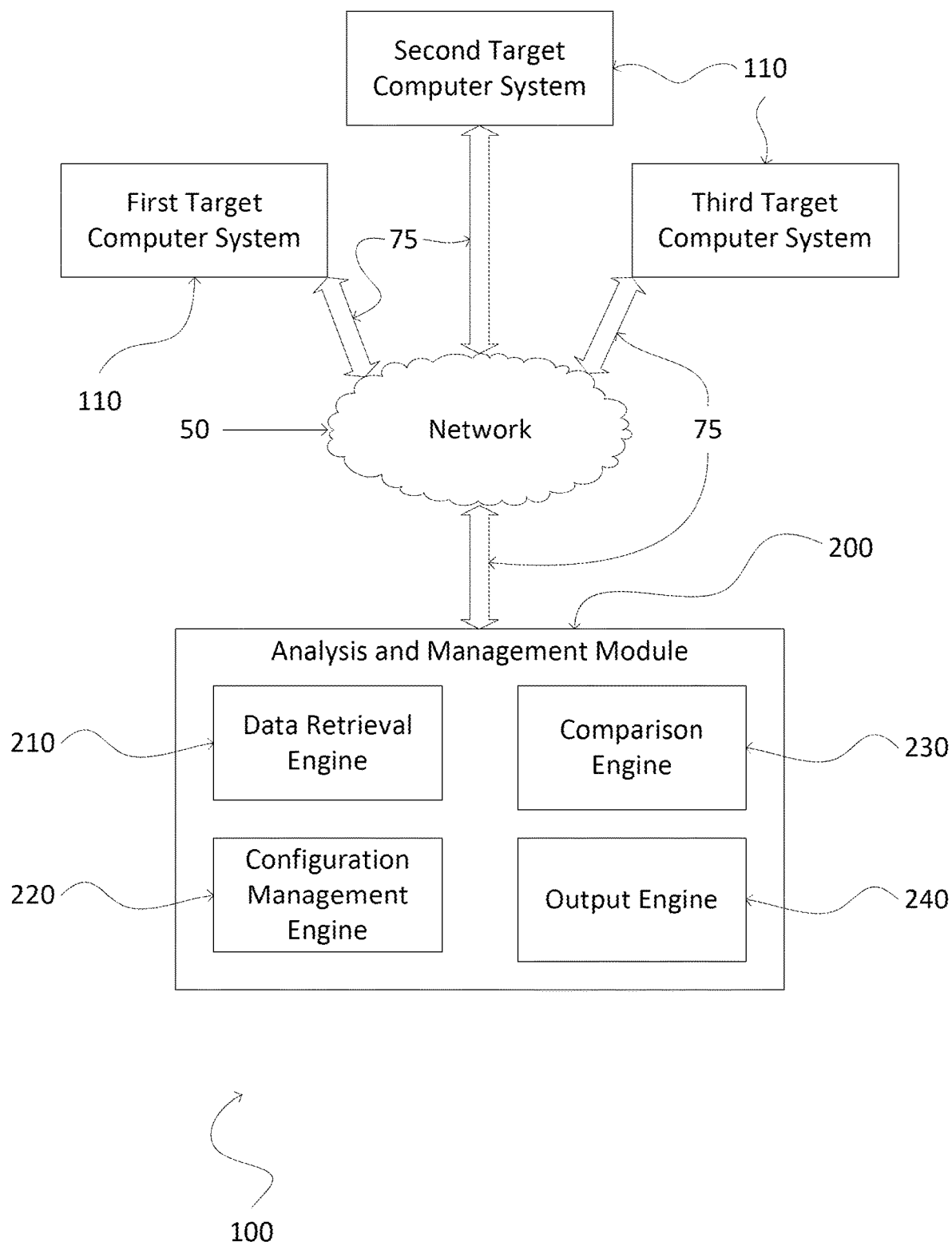
FIG. 1 depicts one example of a system on which an analytics module operates.

Referring to FIG. 1, illustrated therein is an exemplary hardware diagram depicting system 100 in which the processes described herein may be executed. In one example, system 100 includes one or more target computing systems 110, network 50, communications 75, and analysis and management module 200. Analysis and management module 200 includes data retrieval engine 210, configuration management engine 220, comparison engine 230, and output engine 240.

Analysis and management module 200 in one example may be one or more hardware or software components residing on a server or computer. In another example, analysis and management module 200 may be one or more hardware or software components residing on multiple servers or computers. Analysis and management module 200 may be capable of being coupled to other devices, coupled to peripheral devices, coupled to input/output devices, or coupled to other systems. Analysis and management module 200 is represented in the drawings as a standalone device, but it may not be not limited to such. Analysis and management module 200 may be coupled to other devices in a distributed processing environment.

Referring further to FIG. 1, it is to be appreciated that network 50 depicted in FIG. 1 may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, the system 100 may be connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. Devices 110 and analysis and management module 200 communicate over network 50 through one or more communications links 75 formed between data interfaces of devices 110 and analysis and management module 200, respectively. Communication links 75 may comprise either wired or wireless links. It is to be appreciated that the illustrated network connections of FIG. 1 are exemplary and other means of establishing a communications link between multiple devices may be used.

Figure 2A:
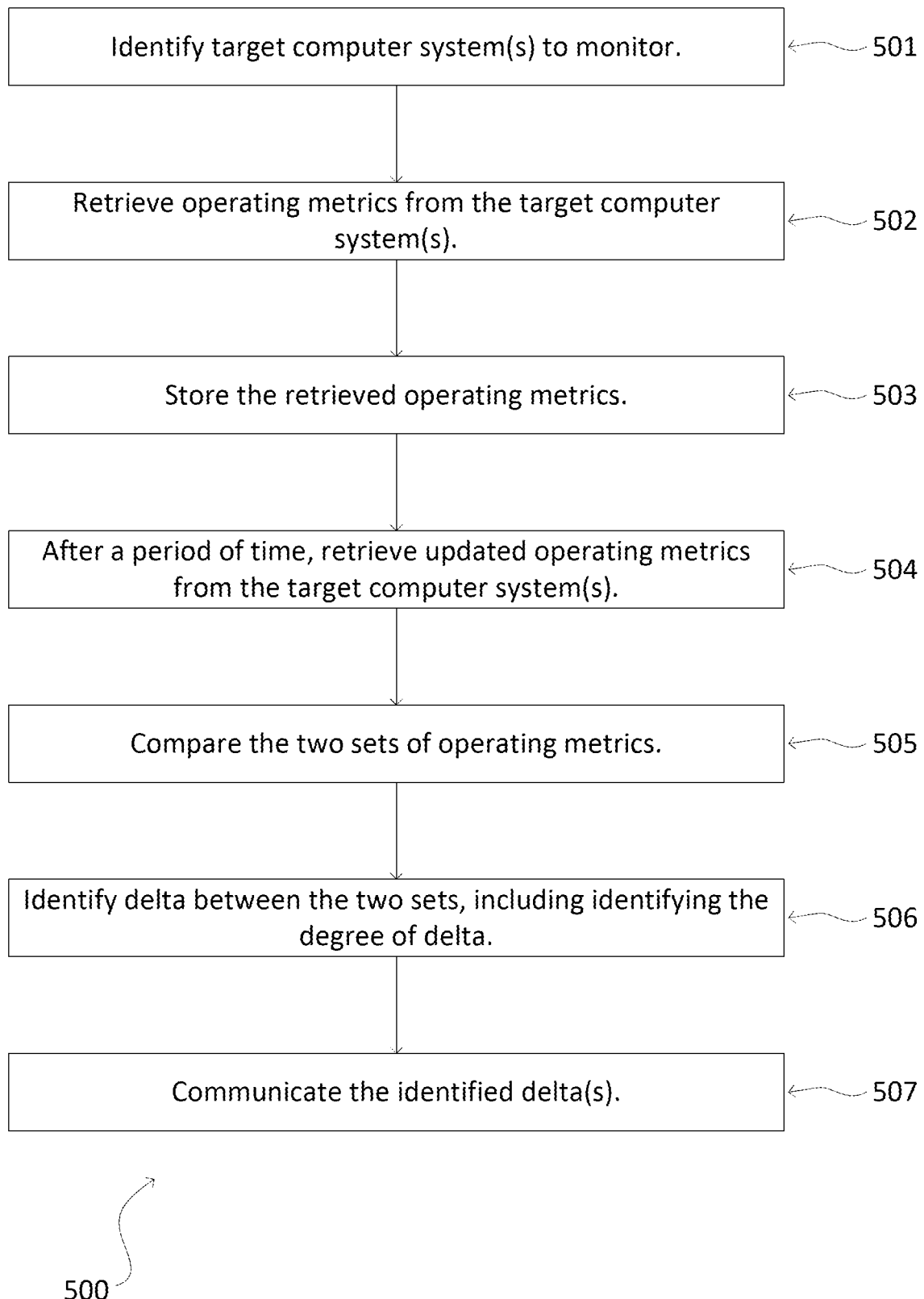
FIG. 2A is a flowchart depicting illustrative operation of the system of FIG. 1.

Referring to FIG. 2A, illustrated therein is an exemplary process 500 of utilizing system 100. Starting at step 501, one or more target computer systems may be identified. These one or more computing systems may each be individual physical computing devices, or one of said "devices" may be a collection or "cloud" that includes multiple computing devices. It is contemplated herein, and it would be recognized by those having ordinary skill in the art, that a "computing device" may include any collection of physical hardware, either centrally located or not, that may be viewed as being a single computer (e.g., a cloud-based server functioning on the internet may well appear to be a single server even though it actually consists of multiple computing devices that are geographically dispersed). In short, although the terms "computer system" and "computing device" are used herein, it is to be recognized that it is contemplated herein that those terms, as well as their equivalents, may be interpreted to include a computer that maps to more than a single physical device.

Subsequently, operating metrics may be retrieved from the target computer system(s) (step 502). The metrics may include such characteristics as CPU usage, GPU usage, memory (RAM) usage, hard drive usage (including reads from the hard drive, writes to the hard drive, and free space available on the hard drive), software process performance metrics, network latency, network bandwidth, or (error) log messages generated (these may be analyzed individually or the log messages may be grouped according to a category, such as all messages related to (opening) new network connections, or the messages may be grouped according to a severity level of the warning), or any metrics as would be recognized by those skilled in the art. These metrics may be stored (step 503).

Later (e.g., a week later), updated metrics may be received from the target computer system(s) (step 504). Typically the metrics gathered via step 504 will be (generally) consistent with the metrics gathered via step 502, although it is contemplated herein that additional metrics may be gathered in one or both of steps 502 and 504, relative to each other.

Then, the two metrics may be compared (step 505). For ease of reference, the metrics gathered via step 502 will be referred to as Previous Metrics, and the metrics gathered via step 504 will be referred to as Present Metrics, but it will be recognized that these labels may be for ease of reference only and are not meant to limit the chronological context of the two metrics being compared.

Then, the delta (e.g. difference, change, etc.) of the two metrics may be compared (step 506). For example, if Previous Metric A (e.g., intranet bandwidth usage percentage) was 25 and Present Metric A may be 45, then the delta may be identified to be an absolute delta of 20 (i.e., 45−25), or the delta may be identified to be a relative change of 80 (i.e., (45−25)/25). In one example, the deltas may be considered on a basis of the percentage change (for this example, 80%). In another example, the deltas may be considered on a basis of the number of errors (e.g. the absolute delta 20 may be 20 errors).

For a plurality of the metrics (e.g., for all of the metrics), the delta may be calculated. Then, the delta(s) are communicated to be displayed or recorded (step 507).

Regarding the deltas, in one example the deltas are categorized. For example, one set of categorization buckets may include:

1) if Present Metric is >=800% times Previous Metric (i.e., if the present metric has increased by a factor of eight as compared to how it was previously measured),
2) if Present Metric=Previous Metric,
3) if Present Metric>=500% times Previous Metric && Present Metric<=799% times Previous Metric,
4) if Present Metric>=200% times Previous Metric && Present Metric<=499% times Previous Metric,
5) if Present Metric>0% times Previous Metric && Present Metric<=199% times Previous Metric, and
6) if Present Metric occurs at least ten times whereas Previous Metric indicates zero events occurred.

This list of categorizations is exemplary only, and it is contemplated herein that the categories may have any other characteristics as would be recognized by those skilled in the art.

A warning notification may be generated when a Metric may be within a certain category depending on the level of severity of the issue. For example, and referring to the categories listed above, a warning notification may be generated any time that a Metric may be in category 1 or 6. In another example, multiple levels of warnings may be generated, such as a high-level warning for categories 1 and 6, mid-level warning for category 3, and a low-level warning for category 4.

Each warning level may require a different type of response. For example, a low-level warning may not require any response at all. A mid-level warning may require, for example, a response within a certain amount of time, such as 4 hours, that the error be closely monitored, or that it only be repaired during business hours. A high-level warning may require, for example, immediate attention regardless of the time or be required to be fixed within a small time frame, such as 1 hour.

In one example, the time frame used may be 15 minute increments. For example, the occurrence of events may be for within the time scale of 15 minutes, although it is contemplated herein that any time frame increment may be used.

In another or the same example, the difference between Previous Metrics and Present Metrics may be one day, one week, two weeks, one year, or any time difference as would be recognized in the IT world as being useful to generate useful warnings and metadata.

Figure 2B:
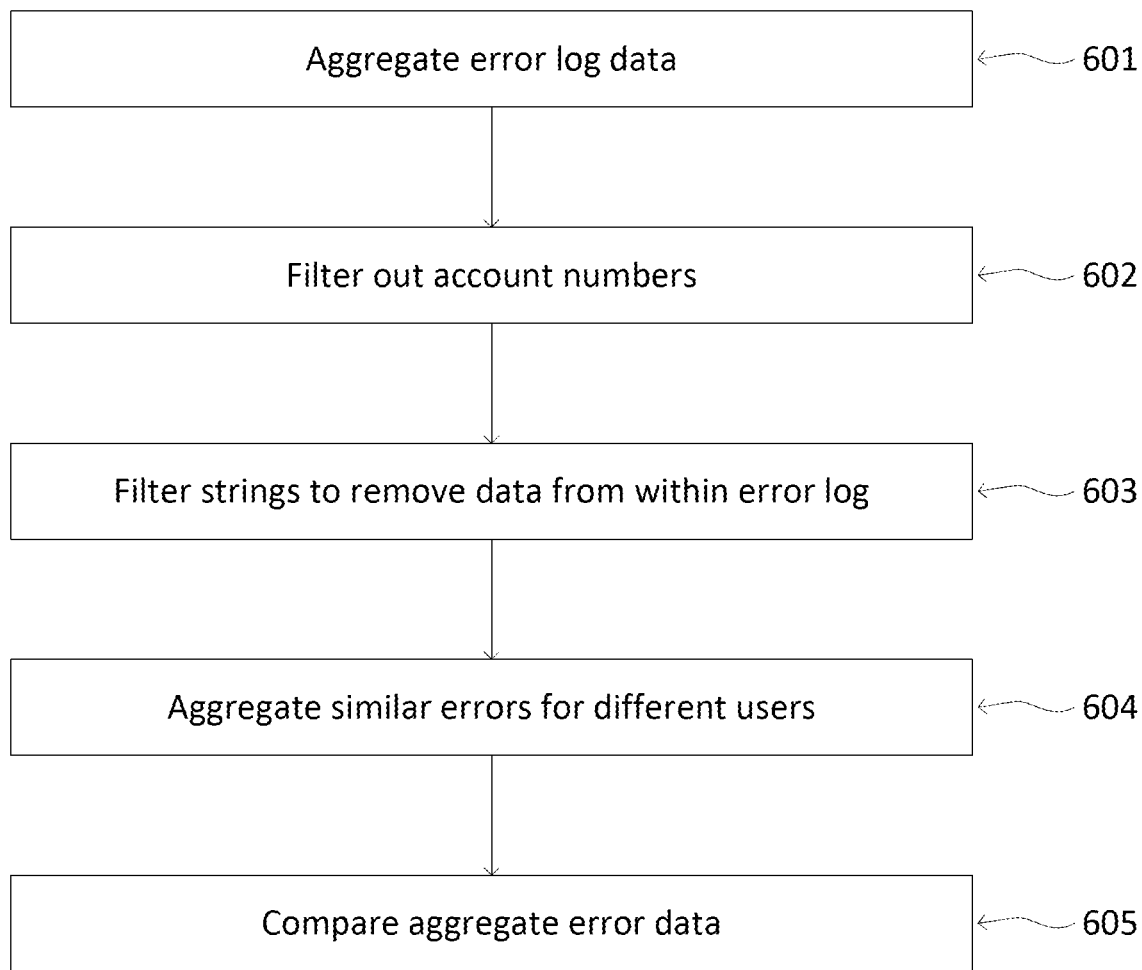
FIG. 2B is a flowchart depicting illustrative operation of 505 of FIG. 2A.

FIG. 2B illustrates a method 600 for how the two sets of operating metrics are compared in step 505. In step 601, error log data may be aggregated. The error log data may be aggregated by, for example, analysis and management module 200. However, each log entry typically contains a string that includes an account number affiliated with the user who experienced the error for which the error log may be created. For example, an error log may read "error1/user1" and another error log may read "error1/user2." This makes it very difficult to group the error log entries so it may be determined that error1 occurred multiple times. So in step 602, account numbers may be filtered out of the log data. For example, "error1/user1" and "error1/user2" may both filter out the user extension so that the error log on both errors reads "error1."

There may be other strings in the error log data that prevent aggregation of similar error messages, so in step 603 other strings in the error log are also filtered. For example, if an error log reads error1/string1/user1, then "/string1" and "/user1" may be filtered out so that only "error1" remains. In one example, some strings may be purposefully left in the error log, such as a timestamp.

In an example, the strings may be filtered so that instead of being removed, the strings are replaced with a generic filler, such as an asterisk. For example, "error1/string1/string2/username1/timestamp" may be modified to read "error1/*/*/timestamp," "error1/string1/*/*," or "error1/*/*/*." This allows error messages to be grouped according to the desired strings.

As another example, timestamps in a string may take a date format such as "ddmmyyyyhhmmss" where dd is the day of the month, mm is the month, yyyy is the year, hh is the hour, mm is the minute, and ss is the second of the log. The timestamp string may be altered or truncated so that error logs may be grouped within a certain timeframe. For example, ddmmyyyyhhmmss can be truncated so that it reads ddmmyyyy to group all error log entries for a particular day. Rules may be used to gather all error messages within a certain timeframe For example, 15<dd<25 may be a rule enacted to gather all error messages between the 16th and 25th of a particular month.

Once the desired strings are removed, in step 604 similar errors for different users may be aggregated. For example, the total number of error1, error2, etc. logs may be determined for each error type. The error logs may be aggregated by error type, time, location, etc. Then in step 605 the aggregate error data may be compared to aggregate error data from another time period.

In an example that includes the previously mentioned examples, error log data may be collected from two different days and compared. To aggregate the error log data of a particular error on day 1, the strings in the logs data may be modified to remove all strings except for strings containing "error1" and truncate all times so that they contain only the desired date. For example, "error1/string1/string2/01022016123033" would read "error1/01022016" for all error1 log entries that occurred on Feb. 1, 2016. All error1 entries that occurred on Feb. 1, 2016 would be aggregated to obtain a total count. All log entries that do not contain error1 or the 01022016 date of the timestamp would not be included in the count. For example "error2/01022016" and "error1/02022016" would not be counted.

The process may then be repeated for a second time period, which would usually be the current date. If today were Feb. 2, 2016, the above process would be repeated to aggregate all error1 messages on Feb. 2, 2016 using "02022016" as the truncated timestamp instead of "01022016." Once the total counts for the "error1" error type for both days are determined, they may then be compared to determine the overall delta (change) in the number of errors for that error type between the two days. A warning may be issued if the delta false within a certain range. There may be multiple ranges that indicate different levels of severity, such as low medium or high. Each level of severity may require a different type of response.

Figure 3:
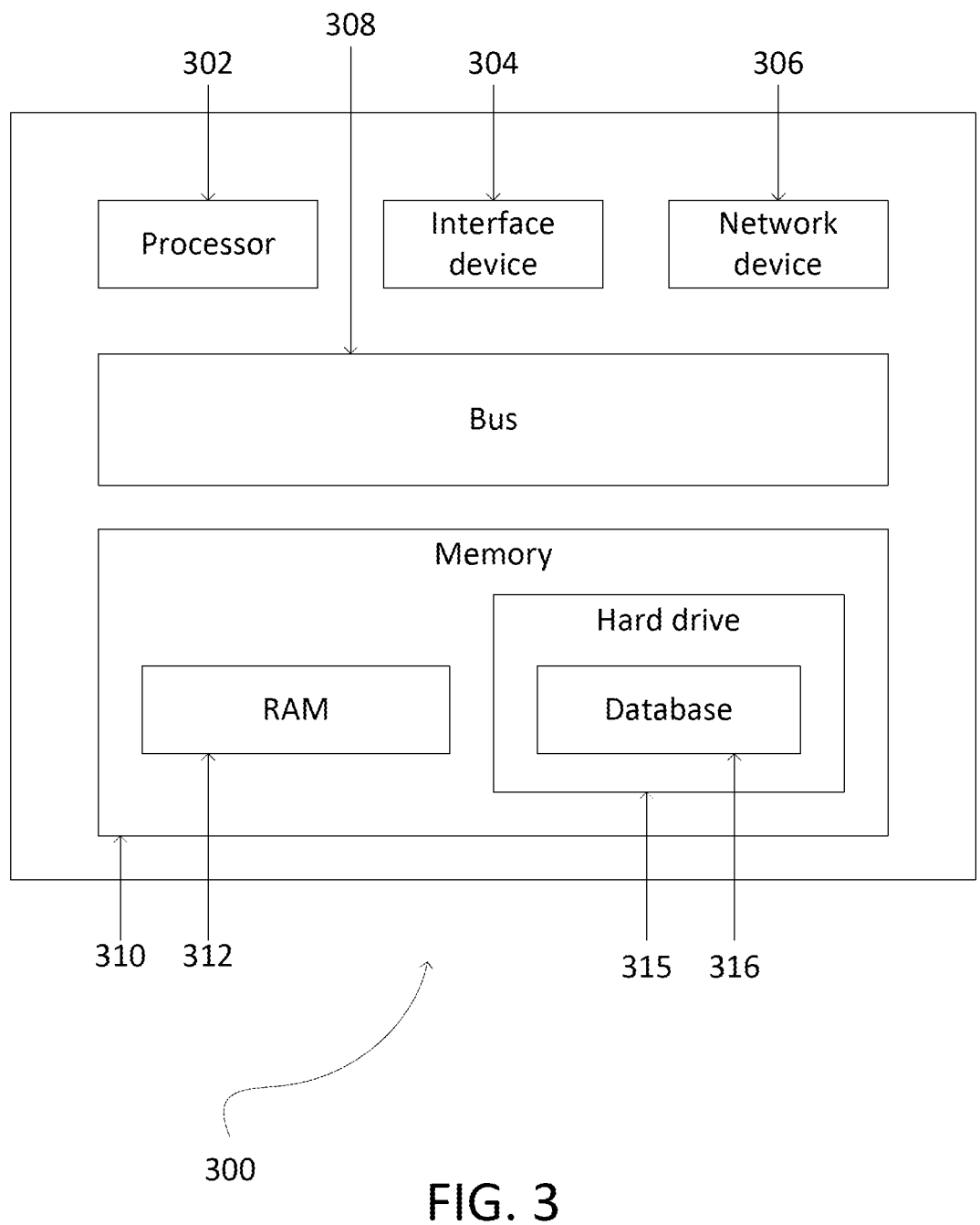
FIG. 3 is an exemplary computing device that may be used in the example of FIG. 1.

Referring to FIG. 3, illustrated therein is an exemplary examples of a computing device as might be used when utilizing the systems and methods described herein. In one example, computing device 300 includes memory 310, a processor 302, an interface device 304 (e.g., mouse, keyboard, monitor), and a network device 306. Memory 310 in one example comprises a computer-readable signal-bearing medium. One example of a computer-readable signal-bearing medium comprises a recordable data storage medium, such as a magnetic, optical, biological, or atomic data storage medium. In another example, a computer-readable signal-bearing medium comprises a modulated carrier signal transmitted over a network coupled with system 100, for instance, a telephone network, a local area network ("LAN"), the Internet, or a wireless network. In one example, memory 310 includes a series of computer instructions written in or implemented with any of a number of programming languages, as will be appreciated by those skilled in the art.

Memory 310 in one example includes RAM 312, hard drive 315, which may include database 316. Database 316 in one example holds information, such as information that relates to users or parties interacting with system 100. Further, database 316 may reside at a location other than on vehicle informatics analytics module 120. For instance, database 316 may reside on one or more participant devices 110 or other third party devices as part of a cloud based or distributed computing environment.

An example of interface 304 may be a graphical user interface (GUI). A GUI may display the delta in error numbers for a certain error type. The delta may be automatically calculated and a warning may be displayed in the GUI according to severity. The GUI may receive input from a user in the form of a response to the warning. The GUI may also receive input that allows a user to change the time periods for which the delta may be calculated. As the user changes the time periods for which the delta may be calculated, the GUI may automatically adjust the information displayed to reflect the change. The GUI may also display the delta over a given period of time so that trends in error may be determined. It can be appreciated that a person having ordinary skill in the art could use GUI for numerous other purposes and in numerous other ways within the scope of this invention.

In an example, warning severity levels may be displayed differently in GUI to draw a user's attention to the warning. For example, a low-level severity warning may be displayed in yellow, a medium-level warning may be displayed in orange, and a high-level warning may be displayed in red. In an example, the GUI may also include a hyperlink associated with the warning that may redirect the user to different interface, such as a web page or knowledge base, with instructions on what steps need to be taken to resolve the issue. In another example, the GUI may provide for a remote connection to be established to the computing device from which the warning originates, thus allowing a user to access the computing device to resolve the issue remotely from within the GUI.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 310 or separately in any of hardware (e.g., electronic circuitry), firmware, software, or a combination thereof. In one example, engines/modules contain instructions for controlling processor 302 to execute the methods described herein. Examples of these methods are explained in further detail in the subsequent examples.

The techniques described herein are exemplary, and should not be construed as implying any particular limitation on the present disclosure. It should be understood that various alternatives, combinations and modifications could be devised by those skilled in the art. For example, steps associated with the processes described herein may be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the examples disclosed above, those skilled in the art will readily appreciate that changes and modifications may be made thereto without departing from the spirit and scope of the subject invention.

What is claimed:

1. A method comprising:
    filtering secondary data from error log data from a set of data, wherein the error log data relates to an operating metric from a target computer system;
    determining, based on receiving a user input indicating to calculate a number of errors of an error type and based on the filtered error log data, the number of errors of the error type;
    determining, based on the number of errors, a severity level of a warning associated with operation of the target computer system;
    outputting, based on the severity level of the warning, an indication of an issue associated with the operation of the target computer system; and
    requiring, based on the severity level, a response to the indication.

2. The method of claim 1, wherein the operating metric is associated with at least one of CPU usage, GPU usage, memory usage, hard drive usage, software process performance metrics, network latency, network bandwidth, or error log messages.

3. The method of claim 1, wherein the secondary data comprises account information.

4. The method of claim 1, wherein the filtering the secondary data from the error log data comprises replacing the second secondary data with a generic filler.

5. The method of claim 1, wherein the target computer system comprises a cloud-computing system.

6. The method of claim 1, wherein the severity level is further based on an error type and the error type comprise errors associate with at least one of CPU usage, GPU usage, memory storage, hard drive usage, software process performance metrics, network latency, or network bandwidth.

7. The method of claim 1, wherein the determining, based on the number of errors, the severity level of the warning associated with operation of the target computer system is further based on a change in the number of errors over a period of time.

8. The method of claim 1, further comprising filtering the secondary data, wherein the secondary data comprises a string; and
wherein the filtering the secondary data comprises removing a portion of the string that prevents aggregation of error messages and leaving a portion of the string that does not prevent aggregation of error messages.

9. A computing device comprising:
one or more processors; and
memory storing instructions that, when executed by the one or more processors, causes the computing device to:
  filter secondary data from error log data from a set of data, wherein the error log data relates to an operating metric from a target computer system;
  determine based on receiving a user input indicating to calculate a number of errors of an error type and based on the filtered error log data, the number of errors of the error type;
  determine, based on the number of errors, a severity level of a warning associated with operation of the target computer system;
  output, based on the severity level of the warning, an indication of an issue associated with the operation of the target computer system; and
  require, based on the severity level, a response to the indication.

10. The computing device of claim 9, wherein the operating metric comprises at least one of CPU usage, GPU usage, memory usage, hard drive usage, software process performance metrics, network latency, network bandwidth, or error log messages.

11. The computing device of claim 9, wherein the instructions cause the computing device to filter the secondary data by replacing the secondary data with a generic filler.

12. The computing device of claim 9, wherein the secondary data comprises a timestamp.

13. The computing device of claim 12, wherein the secondary data comprises a string.

14. The computing device of claim 13, wherein the instructions cause the computing device to filter the secondary data by truncating the string.

15. A non-transitory computer-readable medium storing instructions that, when executed, cause operations comprising:
  filtering secondary data from error log data from a set of data, wherein the error log data relates to an operating metric from a target computer system;
  determining, based on receiving a user input indicating to calculate a number of errors of an error type and based on the filtered error log data, the number of errors of the error type;
  determining, based on the number of errors, a severity level of a warning associated with operation of the target computer system; and
  outputting, based on the severity level of the warning, an indication of an issue associated with the operation of the target computer system; and
  requiring, based on the severity level, a response to the indication.

16. The non-transitory computer-readable medium of claim 15, wherein the operating metric comprises at least one of CPU usage, GPU usage, memory usage, hard drive usage, software process performance metrics, network latency, network bandwidth, or error log messages.

17. The non-transitory computer-readable medium of claim 15, wherein the secondary data comprises at least one of a string, a generic filler, or data that prevents aggregation of error messages.

18. The non-transitory computer-readable medium of claim 15, wherein the filtering the secondary data from the error log data comprises altering a timestamp to group error logs within a certain timeframe.

19. The non-transitory computer-readable medium of claim 15, wherein the operations further comprise comparing the number of errors to a number of errors from another error log from another set of data; and
  wherein the determining the severity level is further based on comparing the number of errors.

\* \* \* \* \*